United States Patent
Ichikawa et al.

(10) Patent No.: US 8,552,596 B2
(45) Date of Patent: Oct. 8, 2013

(54) POWER TRANSMITTING APPARATUS AND POWER TRANSMISSION SYSTEM

(75) Inventors: Keiichi Ichikawa, Nagaokakyo (JP); Hironori Sakai, Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 229 days.

(21) Appl. No.: 13/213,955

(22) Filed: Aug. 19, 2011

(65) Prior Publication Data

US 2012/0049640 A1   Mar. 1, 2012

(30) Foreign Application Priority Data

Aug. 25, 2010  (JP) ................. 2010-187728
Jul. 13, 2011  (JP) ................. 2011-155243

(51) Int. Cl.
*H02J 3/10*   (2006.01)

(52) U.S. Cl.
USPC .......................................... 307/104; 307/72

(58) Field of Classification Search
USPC ..................... 307/72, 104; 320/108
See application file for complete search history.

(56) References Cited

U.S. PATENT DOCUMENTS

| | | | |
|---|---|---|---|
| 7,208,912 B2 * | 4/2007 | Ghabra et al. | 320/108 |
| 8,400,105 B2 * | 3/2013 | Kondo | 320/108 |
| 2002/0089305 A1 * | 7/2002 | Park et al. | 320/108 |
| 2009/0302690 A1 | 12/2009 | Kubono et al. | |
| 2010/0244582 A1 * | 9/2010 | Yoshikawa | 307/104 |
| 2012/0038218 A1 * | 2/2012 | Ichikawa | 307/97 |

FOREIGN PATENT DOCUMENTS

| | | |
|---|---|---|
| JP | 06-150079 A | 5/1994 |
| JP | 08-214405 A | 8/1996 |
| JP | 2005-079786 A | 3/2005 |
| JP | 2008-263710 A | 10/2008 |
| JP | 2009-296857 A | 12/2009 |
| JP | 2011-083132 A | 4/2011 |

OTHER PUBLICATIONS

The First Office Action issued by the State Intellectual Property Office of People's Republic of China on Feb. 20, 2013, which corresponds to Chinese Patent Application No. 201110242360.9 and is related to U.S. Appl. No. 13/213,955 with translation.

* cited by examiner

*Primary Examiner* — Fritz M Fleming
(74) *Attorney, Agent, or Firm* — Studebaker & Brackett PC (57) ABSTRACT

This disclosure provides a power transmitting apparatus including coupling electrodes couplable to a power receiving apparatus to transmit power to the receiving apparatus. A high-frequency voltage generator circuit is adapted to supply a high-frequency voltage across the coupling electrodes in accordance with a signal output from a control circuit. A driving power supply switching circuit switches between applying a constant voltage and supplying a constant current to the high-frequency voltage generator circuit. First, by sweeping the driving frequency of the high-frequency voltage generator circuit in a state in which a constant current is supplied, it is determined whether there is a maximal value in the frequency characteristics of a voltage applied to the high-frequency voltage generator circuit. When there is a maximal value, the corresponding frequency is set as the driving frequency, and power transmission is started after the driving power supply switching circuit is switched to a constant voltage.

15 Claims, 8 Drawing Sheets

POWER TRANSMITTING APPARATUS AND POWER TRANSMISSION SYSTEM

CROSS REFERENCE TO RELATED APPLICATIONS

The present application claims priority to Japanese Patent Application No. 2011-155243 filed Jul. 13, 2011, and Japanese Patent Application No. 2010-187728 filed Aug. 25, 2010, the entire contents of each of these applications being incorporated herein by reference in their entirety.

FIELD OF THE INVENTION

The present invention relates to power transmitting apparatuses and power transmission systems for wireless power transmission.

BACKGROUND

Examples of typical known systems for transmitting power between apparatuses arranged close to each other include magnetic-field-coupling power transmission systems in which power is transmitted from the primary coil of a power transmitting apparatus to the secondary coil of a power receiving apparatus utilizing a magnetic field. However, when power is transmitted through magnetic field coupling, since electromotive force is strongly influenced by the magnitude of magnetic flux passing through each coil, high accuracy is required in the relative positional relationship between the primary coil and the secondary coil. In addition, since coils are used, it is difficult to reduce the sizes of the apparatuses.

On the other hand, an electric-field-coupling wireless power transmission system is known, as disclosed in Japanese Unexamined Patent Application Publication No. 2009-296857. In this system, power is transmitted from the coupling electrodes of a power transmitting apparatus to the coupling electrodes of a power receiving apparatus through an electric field. This method allows the required accuracy of the relative positional relationship between the coupling electrodes of the power transmitting apparatus and the coupling electrodes of the power receiving apparatus to be relatively low and allows the sizes and thicknesses of the coupling electrodes to be reduced.

Figure 1:
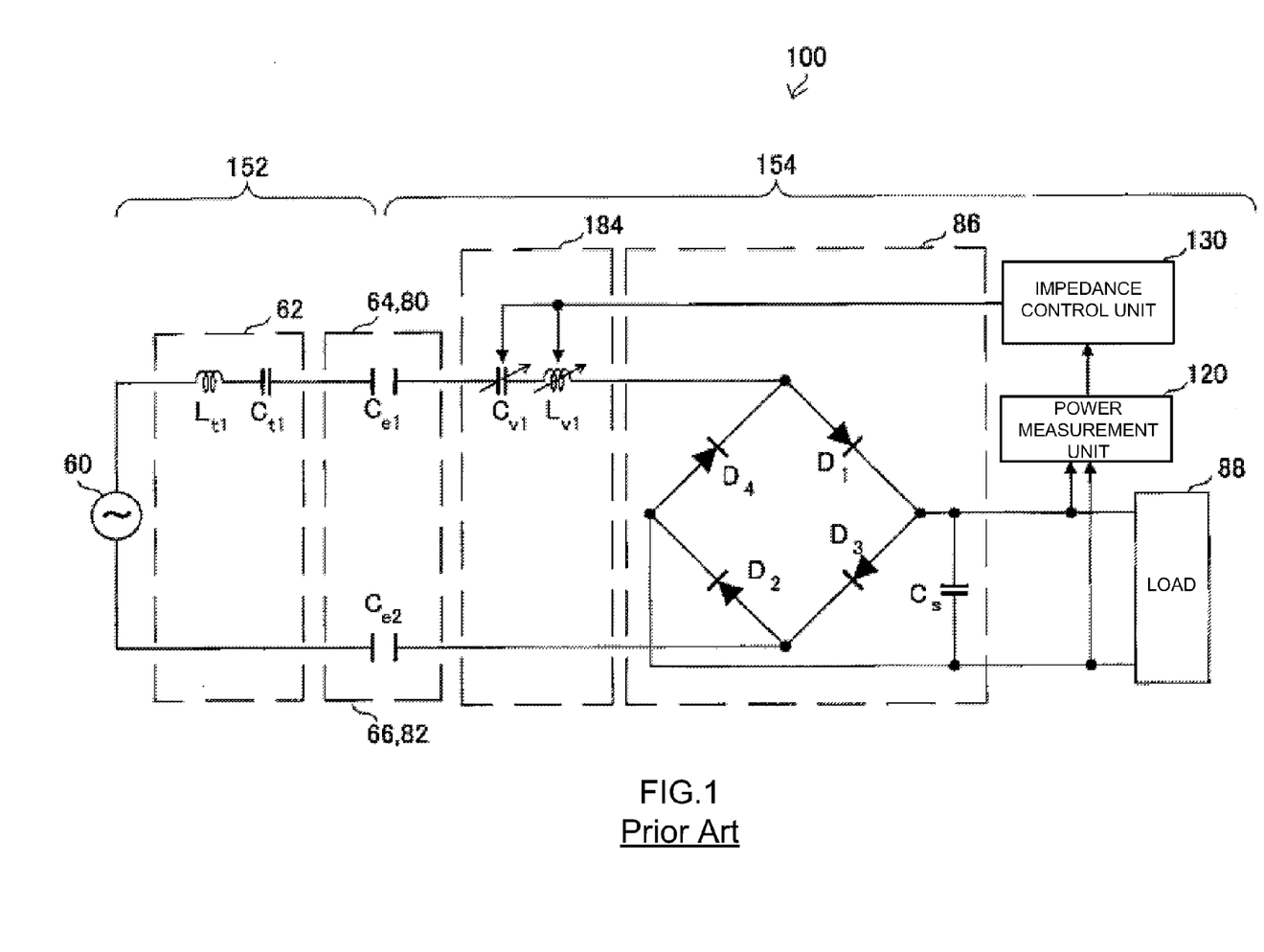
FIG. 1 is block diagram of a power transmission system disclosed in Japanese Unexamined Patent Application Publication No. 2009-296857.

FIG. 1 is block diagram of a power transmission system 100 disclosed in Japanese Unexamined Patent Application Publication No. 2009-296857. This power transmission system 100 includes a power transmitting apparatus 152 and a power receiving apparatus 154. The power transmitting apparatus 152 includes a resonator unit 62 and power transmitting electrodes 64 and 66. The power receiving apparatus 154 includes power receiving electrodes 80 and 82, a resonator unit 184, a rectifier unit 86, a circuit load 88, a power measurement unit 120, and an impedance control unit 130. The power measurement unit 120 measures the level of power currently being supplied to the circuit load 88 by detecting a voltage across the two terminals of the circuit load 88, and outputs the measured power level to the impedance control unit 130. The impedance control unit 130, on the basis of the power level output from the power measurement unit 120, controls a voltage across a variable capacitance device Cv1 (for example, a varicap device) or the inductance of a variable inductance device Lv1, thereby maximizing the supplied power level.

In the power transmission system disclosed in Japanese Unexamined Patent Application Publication No. 2009-296857, the level of power currently supplied to the circuit load 88 is measured by detecting a voltage across the two terminals of the circuit load 88, and the frequency of an AC signal generated by an AC signal generator unit is controlled by controlling the capacitance of a variable capacitance device or the inductance of a variable inductance device, thereby maximizing the supplied power level. However, this control is complex.

SUMMARY

The present disclosure provide a power transmission system that can allow power transmission efficiency to be increased by simple control and allowing power supplied to a load to be appropriately controlled.

In an aspect of the disclosure, a power transmitting apparatus can form a pair with a power receiving apparatus that includes secondary side coupling electrodes and a high-frequency voltage load circuit connected to the secondary side coupling electrodes and that has a resonant circuit formed of the secondary side coupling electrodes and the high-frequency voltage load circuit.

The power transmitting apparatus includes primary side coupling electrodes couplable to the secondary side coupling electrodes, a high-frequency voltage generator circuit adapted to apply a high-frequency voltage across the primary side coupling electrodes, a driving power supply circuit that is adapted to supply driving power to the high-frequency voltage generator circuit and includes a driving power supply switching unit adapted to supply either a constant current or a constant voltage to the high-frequency voltage generator circuit, a voltage detection unit adapted to detect a voltage supplied to the high-frequency voltage generator circuit, and a control unit adapted to detect a frequency at which the voltage supplied to the high-frequency voltage generator circuit becomes a maximal voltage for a change in frequency of a voltage generated by the high-frequency voltage generator circuit in a state in which the constant current is supplied. The control unit is adapted to set the frequency corresponding to the maximal voltage as the frequency of the voltage generated by the high-frequency voltage generator circuit and to perform switching so as to supply the constant voltage.

In a more specific embodiment, the driving power supply circuit may include a constant voltage source, a constant current source, and a switch for switching between the constant voltage source and the constant current source.

In another more specific embodiment, the driving power supply circuit may include a constant voltage source, a constant current diode that supplies a constant current from the constant voltage source to the high-frequency voltage generator circuit, and a bypass switch that bypasses the constant current diode. This configuration allows a constant voltage source to be formed by turning on the switch. By turning off the switch, a constant current source can be easily formed using a constant current diode.

In another more specific embodiment, the driving power supply circuit may include a constant voltage source, a resistor that supplies a current from the constant voltage source to the high-frequency voltage generator circuit, and a bypass switch that bypasses the resistor. This configuration allows a constant voltage source to be formed by turning on the switch. By turning off the switch, a constant current source that supplies a nearly constant current through a resistor can be easily formed.

In yet another more specific embodiment, the control unit may include a processing unit adapted to detect the frequency corresponding to the maximal voltage by executing the steps of setting the driving power supply circuit to a constant current source, setting a frequency of a voltage generated by the high-frequency voltage generator circuit to an initial value, detecting a voltage supplied to the high-frequency voltage generator circuit, increasing a frequency of a voltage generated by the high-frequency voltage generator circuit by an incremental amount, comparing the frequency of a voltage generated by the high-frequency voltage generator circuit with a final frequency value, and determining whether there is a maximal value of the voltage supplied to the high-frequency voltage generator circuit.

In another more specific embodiment, the control unit may include a processing unit adapted to detect the frequency corresponding to the maximal voltage by executing the steps of setting the driving power supply circuit to a constant current source, setting a frequency generated by the high-frequency voltage generator circuit to an initial value, detecting a voltage supplied to the high-frequency voltage generator circuit, increasing a frequency of a voltage generated by the high-frequency voltage generator circuit by an incremental amount, determining whether there is a maximal value of the voltage supplied to the high-frequency voltage generator circuit on the basis of voltages supplied to the high-frequency voltage generator circuit at the center and two ends of a frequency range composed of a plurality of continuous incremental amounts, and comparing the frequency of a voltage generated by the high-frequency voltage generator circuit with a final frequency value.

In another aspect of the disclosure, a power transmission system includes a power transmitting apparatus and a power receiving apparatus. The power transmitting apparatus includes primary side coupling electrodes, a high-frequency voltage generator circuit adapted to apply a high-frequency voltage across the primary side coupling electrodes, and a driving power supply circuit adapted to supply driving power to the high-frequency voltage generator circuit. The power receiving apparatus includes secondary side coupling electrodes and a high-frequency voltage load circuit connected to the secondary side coupling electrodes. The power receiving apparatus has a resonant circuit formed of the secondary side coupling electrodes and the high-frequency voltage load circuit. The primary side coupling electrodes of the power transmitting apparatus and the secondary side coupling electrodes of the power receiving apparatus side coupling electrodes are adapted to capacitively couple to each other to transmit power.

The power transmitting apparatus of the power transmission system further includes a driving power supply switching unit adapted to allow the driving power supply circuit to supply either a constant current or a constant voltage to the high-frequency voltage generator circuit, a voltage detection unit adapted to detect a voltage supplied to the high-frequency voltage generator circuit, and a control unit. The control unit is adapted to detect a frequency at which the voltage supplied to the high-frequency voltage generator circuit becomes a maximal voltage for a change in frequency of a voltage generated by the high-frequency voltage generator circuit, in a state in which the constant current is supplied, to set the frequency corresponding to the maximal voltage as the frequency of the voltage generated by the high-frequency voltage generator circuit, and to perform switching so as to supply the constant voltage.

Other features, elements, and characteristics, and advantages of the present invention will become more apparent from the following detailed description of preferred embodiments of the present invention with reference to the attached drawings.

DETAILED DESCRIPTION

Figure 2:
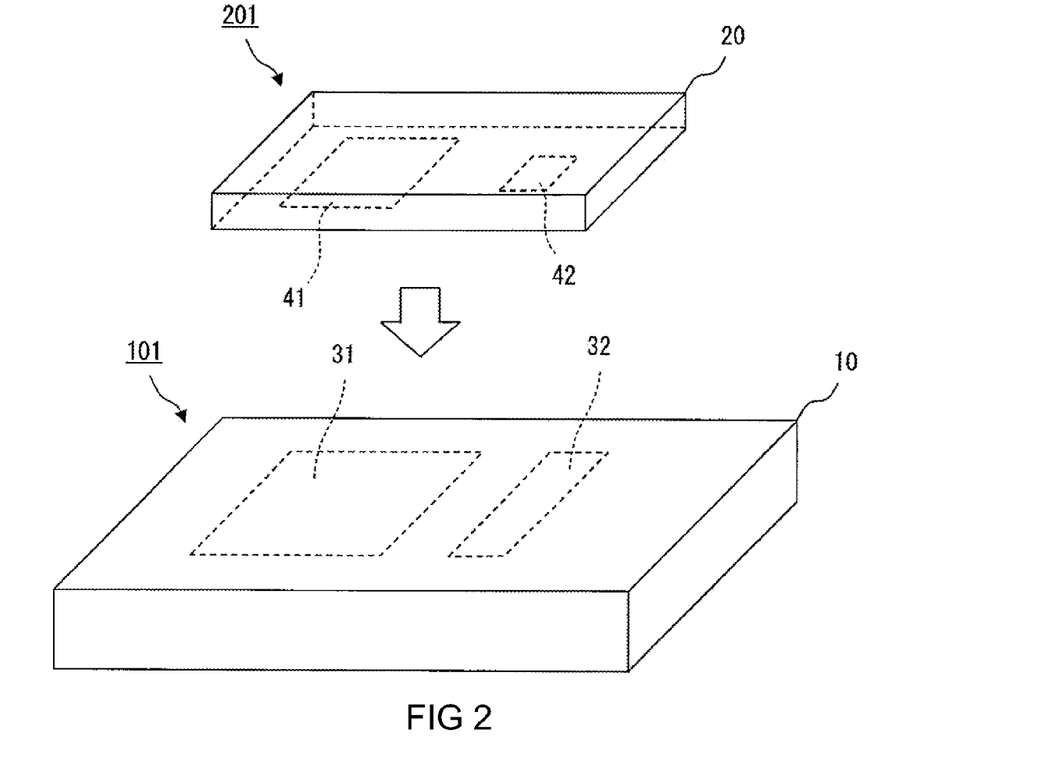
FIG. 2 illustrates perspective views of a power transmitting apparatus and a power receiving apparatus according to a first exemplary embodiment.

FIG. 2 illustrates perspective views of a power transmitting apparatus 101 and a power receiving apparatus 201 according to a first exemplary embodiment. The power transmitting apparatus 101 and the power receiving apparatus 201 form a wireless power transmission system.

The power transmitting apparatus 101 includes a power transmitting apparatus side passive electrode 31 and a power transmitting apparatus side active electrode 32, and the power receiving apparatus 201 includes a power receiving apparatus side passive electrode 41 and a power receiving apparatus side active electrode 42. The power transmitting apparatus side passive electrode 31 and the power transmitting apparatus side active electrode 32 correspond to primary side coupling electrodes of the present disclosure. The power receiving apparatus side passive electrode 41 and the power receiving apparatus side active electrode 42 correspond to secondary side coupling electrodes of the present disclosure.

Capacitance is generated between the primary side coupling electrodes and the secondary side coupling electrodes by mounting the power receiving apparatus 201 on the power transmitting apparatus 101. In this state, the power transmitting apparatus 101 transmits power to the power receiving apparatus 201 through electric field coupling.

Figure 3:
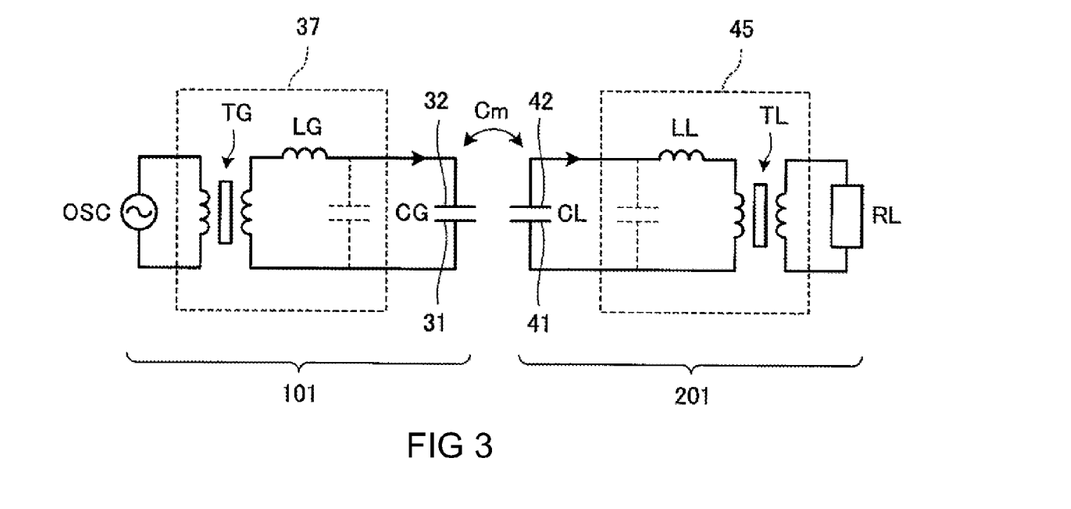
FIG. 3 is an equivalent circuit diagram of a wireless power transmission system.

FIG. 3 is an equivalent circuit diagram of the wireless power transmission system. Referring to FIG. 3, a high-frequency voltage generator OSC of the power transmitting apparatus 101 generates a high-frequency voltage with a frequency of, for example, about 100 kHz to tens of MHz. A voltage step-up circuit 37 formed of a step-up transformer TG and an inductor LG steps up a voltage generated by the high-frequency voltage generator OSC and applies the stepped-up voltage between the passive electrode 31 and the active electrode 32. A capacitor CG corresponds to a capacitance between the passive electrode 31 and the active electrode 32. The voltage step-up circuit 37 and the capacitor CG form a resonant circuit. A voltage step-down circuit 45 formed of a step-down transformer TL an inductor LL is connected between the passive electrode 41 and the active electrode 42 of the power receiving apparatus 201. A capacitor CL corresponds to a capacitance between the passive electrode 41 and the active electrode 42. The voltage step-down circuit 45 and the capacitor CL form a resonant circuit. Specifically, the resonance circuit of the step-up circuit is composed of inductor LG and capacitances CG, Cm and CL and the inductor LG can be replaced by a leakage inductance of a step-up transformer TG. The resonance circuit of the step-down circuit is composed of inductance of the step-down transformer and capacitances CL, Cm and CG. The inductor LL is a leakage inductance of the step-down transformer TL and the inductance value of the inductor LL is usually set to be small. A load circuit RL is connected to the secondary side of the step-down transformer TL. The load circuit RL is formed of a rectifying and smoothing circuit including diodes and a capacitor, and a secondary battery. A circuit formed of the voltage step-down circuit 45 and the load circuit RL corresponds to a "high-frequency voltage load circuit" of the present disclosure. A capacitor Cm indicates a state of capacitance coupling.

A method of detecting whether the power transmitting apparatus 101 is coupled to the power receiving apparatus 201 and determining a driving frequency for power transmission is described below.

Figure 4:
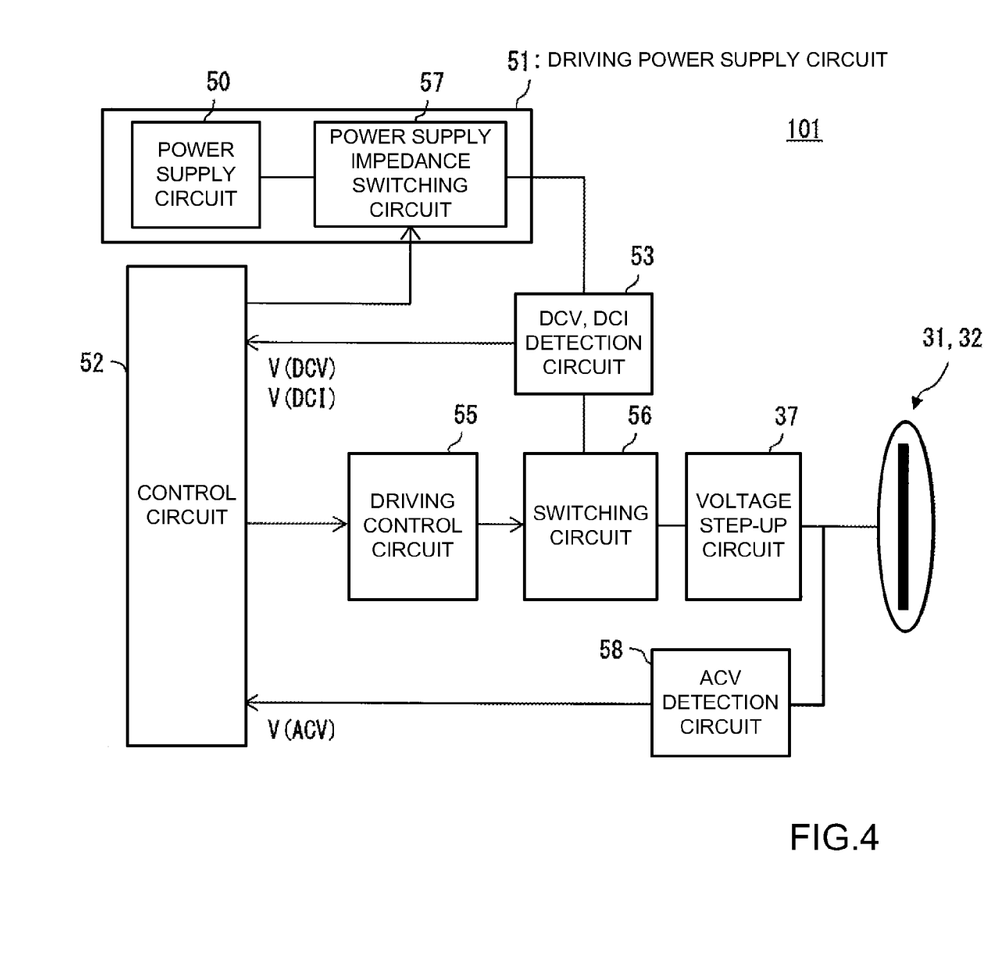
FIG. 4 is a configuration block diagram of the power transmitting apparatus.

FIG. 4 is a configuration block diagram of the power transmitting apparatus 101. Here, a driving power supply circuit 51 is a power supply circuit that generates, for example, a constant DC voltage (for example, about 5 volts DC) using a commercial power supply as an input. A control circuit 52 corresponds to a "control unit" of the present disclosure and controls various units described below through input and output of signals from and to the units.

A driving control circuit 55 switches a switching device of a switching circuit 56 in accordance with a signal output from a control circuit 52. The switching circuit 56 performs alternating driving of the input of the voltage step-up circuit 37, as will be described later.

A DCV/DCI detection circuit 53 corresponds to a "voltage detection unit" of the present disclosure and detects a voltage applied to the switching circuit 56 and a driving current (i.e., amount of current supplied from the driving power supply circuit 51 to the voltage step-up circuit 37) flowing through the switching circuit 56. The control circuit 52 reads these detection signals V (DCV) and V (DCI). An ACV detection circuit 58 capacitively divides a voltage between the power transmitting apparatus side passive electrode 31 and the power transmitting apparatus side active electrode 32, and generates a DC voltage as a detection signal V (ACV) by rectifying the divided AC voltage. The control circuit 52 reads the detection signal V (ACV). A power supply impedance switching circuit 57 is a circuit for switching the output impedance of the driving power supply circuit 51 and switches between applying a constant voltage and supplying a constant current to the switching circuit 56.

Figure 5:
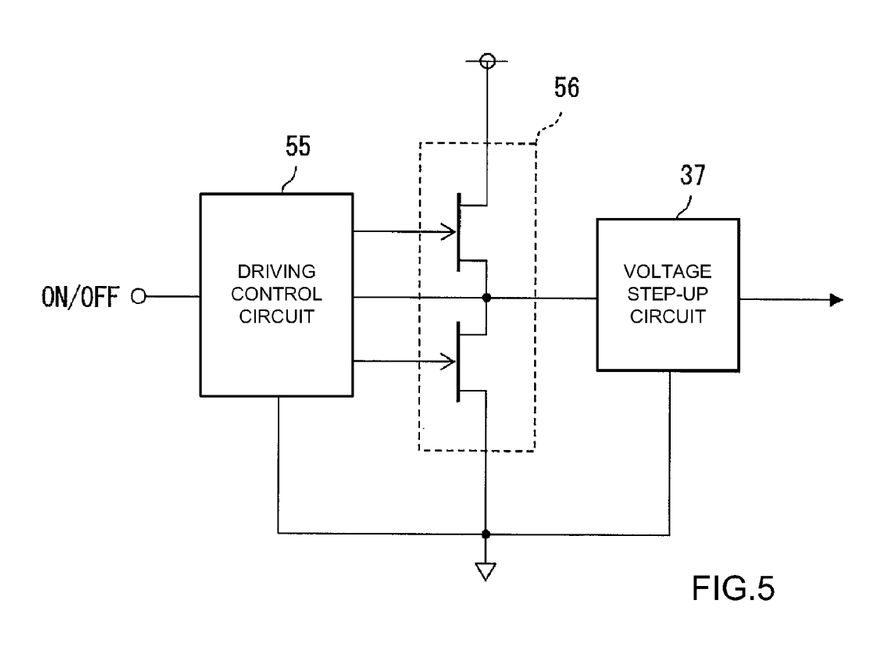
FIG. 5 illustrates the relationship between the configuration of a switching circuit and a driving control circuit.

FIG. 5 illustrates the relationship between the configuration of the switching circuit 56 and the driving control circuit 55. The switching circuit 56 performs a push-pull operation through ON/OFF switching of a high-side switching device and a low-side switching device, thereby performing alternating driving of the voltage step-up circuit 37.

The voltage after being stepped up by the voltage step-up circuit 37 is a voltage ranging from 100 V to 10 kV. This voltage is applied between the passive electrode 31 and the active electrode 32, whereby an electrostatic field is formed in the surrounding medium.

Figure 6:
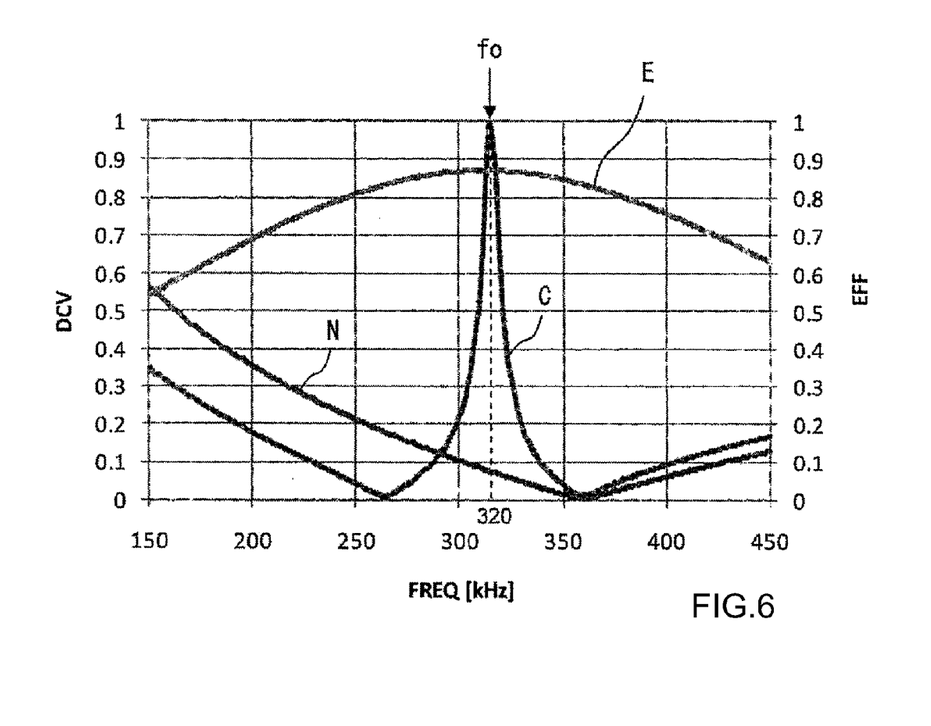
FIG. 6 illustrates the frequency characteristics of DCV.

FIG. 6 illustrates the frequency characteristics of DCV and also power transmission efficiency. Referring to FIG. 6, characteristics curve C shows the frequency characteristics of DCV in a state in which almost no current flows through the load circuit RL of the power receiving apparatus illustrated in FIG. 3 and characteristics curve N shows the frequency characteristics of DCV in a state in which the power receiving apparatus is not mounted, that is, in a state in which there is only the power transmitting apparatus. In this manner, in a state in which the power receiving apparatus is mounted and almost no current flows through the load circuit RL of the power receiving apparatus, a peak of DCV appears at a predetermined frequency. This frequency is called a peak frequency fo. On the other hand, in a state in which the power receiving apparatus is not mounted, the peak of DCV does not appear.

Referring to FIG. 6, characteristics curve E shows the frequency characteristics of power transmission efficiency EFF. The peak frequency fo is about 320 kHz in this example, and power can be transmitted at high transmission efficiency when a high-frequency voltage at the frequency fo is generated and thereby power is transmitted to the power receiving apparatus.

Figure 7:
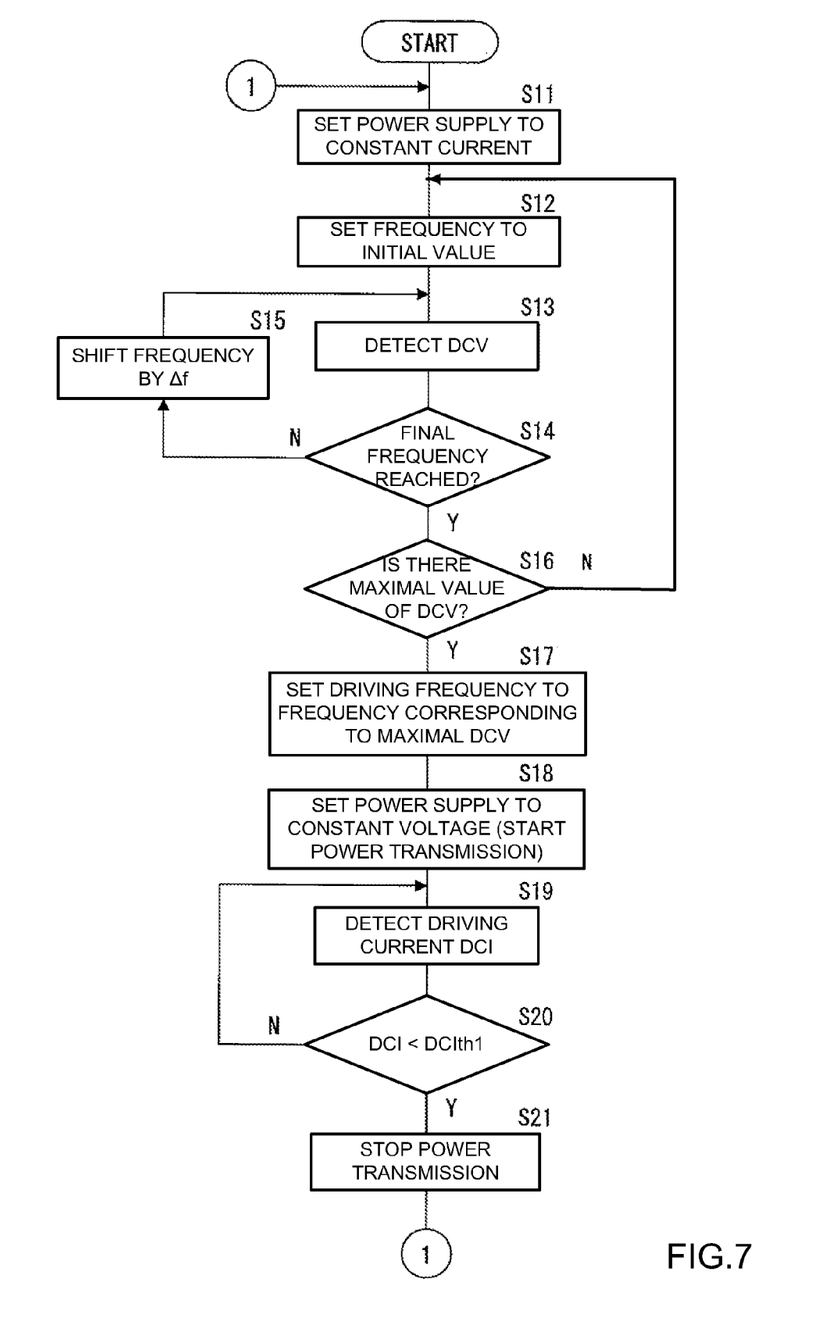
FIG. 7 is a flowchart of processing steps for detecting whether a power receiving apparatus is mounted and for controlling start/stop of power transmission, among the processing steps performed by a control circuit illustrated in FIG. 4.

FIG. 7 is a flowchart of processing steps for detecting whether a power receiving apparatus is mounted and for controlling start/stop of power transmission, among the processing steps performed by a control circuit 52 illustrated in FIG. 4.

First, by switching of the power supply impedance switching circuit 57, a setting is made so as to supply a constant current to the switching circuit 56 (S11). Then, the initial value of a frequency range to be swept is set, and the driving control circuit 55 is driven at the frequency (S12). Then, in that state, a detection signal of the DCV/DCI detection circuit 53 is read (S13).

Then, similar processing is performed after shifting the frequency by an incremental amount, $\Delta f$ (S14→S15→S13). This processing is repeated until the frequency reaches the final value. In this manner, frequency sweeping is performed.

Then, it is determined whether the frequency characteristics of DCV obtained by the above-described frequency sweep have a maximal value (S16). When there are no maximal values, the flow returns to step S12, and the above processing is repeated. When there is a maximal value in the frequency characteristics of DCV, the corresponding frequency fo is set as a driving frequency (S17).

Then, by switching of the power supply impedance switching circuit 57, a setting is made so as to supply a constant voltage to the switching circuit 56. Thereby, power transmission is started (S18).

Then, a driving current DCI flowing through the switching circuit 56 is detected (S19). Then the flow waits until the driving current DCI becomes lower than a threshold DCIth1 (S20→S19 . . . ).

Once the driving current DCI has become lower than the threshold DCIth1, the driving of the driving control circuit 55 is stopped (S21).

After that, the flow returns to step S11. Thereby, the processing of step S11 and subsequent steps is repeated. However, since the secondary battery of the power receiving apparatus is already in a fully charged state, the condition for the determination in step S20 is satisfied, and hence, the battery is not charged again.

When a power receiving apparatus has been removed and another power receiving apparatus to be charged is mounted, charging is performed as a result of determination of the driving frequency and power transmission in accordance with the steps described above.

In a second exemplary embodiment, a specific configuration of the power supply impedance switching circuit 57 illustrated in FIG. 4 is described.

Figure 8:
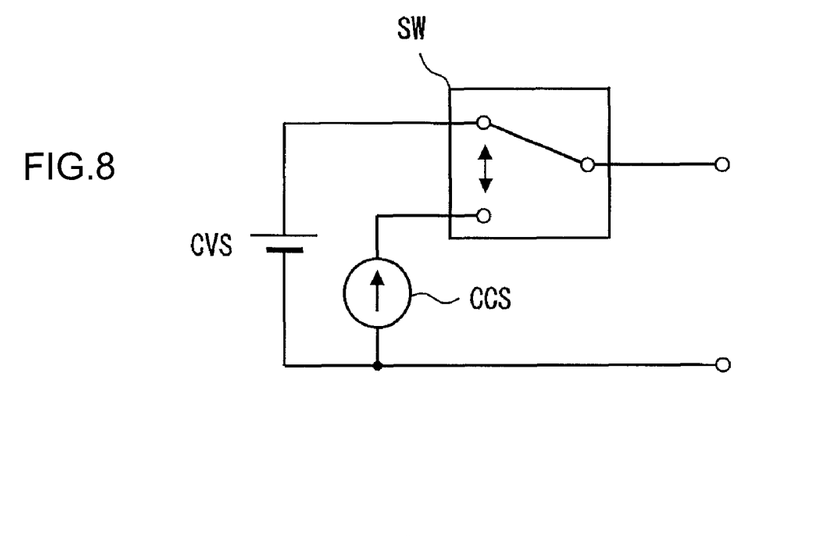
FIG. 8 is a circuit diagram of a portion including a driving power supply circuit and a power supply impedance switching circuit illustrated in FIG. 4.

FIG. 8 is a circuit diagram of a portion including the driving power supply circuit 51 and the power supply impedance switching circuit 57 illustrated in FIG. 4. This circuit is formed of a constant voltage source CVS, a constant current source CCS, and a switch SW. When the switch SW selects the constant voltage source CVS, a constant voltage is output between the output terminals, and when the switch SW selects the constant current source CCS, a constant current is supplied to a circuit connected to the output terminals.

Figure 9A:
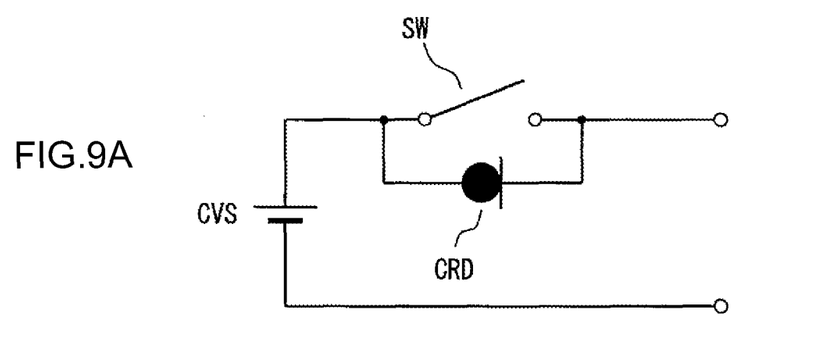
FIGS. 9A and 9B are other circuit diagrams of the portion including the driving power supply circuit and the power supply impedance switching circuit illustrated in FIG. 4.

FIG. 9A is another circuit diagram of the portion including the driving power supply circuit 51 and the power supply impedance switching circuit 57 illustrated in FIG. 4. This circuit is formed of a constant voltage source CVS, a constant current diode CRD, and a bypass switch SW. When the bypass switch is closed, a constant voltage is output between the output terminals, and when the bypass switch SW is open, a constant current is supplied to a circuit connected to the output terminals through the operation of the constant current diode CRD.

Figure 9B:
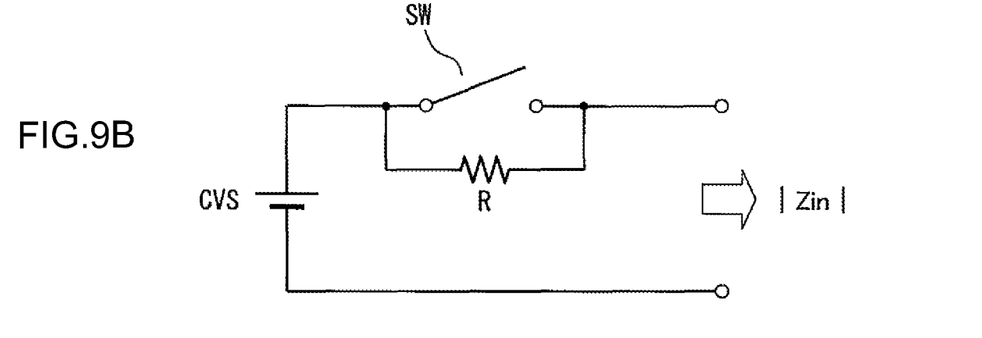

Referring to FIG. 9B, a resistor R may be provided instead of the constant current diode CRD illustrated in FIG. 9A. The resistor R is made to have an impedance that is sufficiently larger than an impedance Zin of a load. Hence, the impedance Zin of the load as seen from the power supply is sufficiently smaller than the output resistance of the power supply. As a result, an approximately constant current is supplied to the load circuit.

In this manner, a constant current source that supplies a constant current to a high-frequency voltage circuit is easily formed by using a constant current diode or a resistor.

In a third exemplary embodiment, processing performed by a control circuit in a transmitting apparatus is described. The hardware configuration of the transmitting apparatus is the same as that illustrated in the first embodiment. In other words, the block diagram of the transmitting apparatus is the same as that illustrated in FIG. 4. The difference from the first embodiment is the control processing performed by the control circuit 52 illustrated in FIG. 4.

Figure 10:
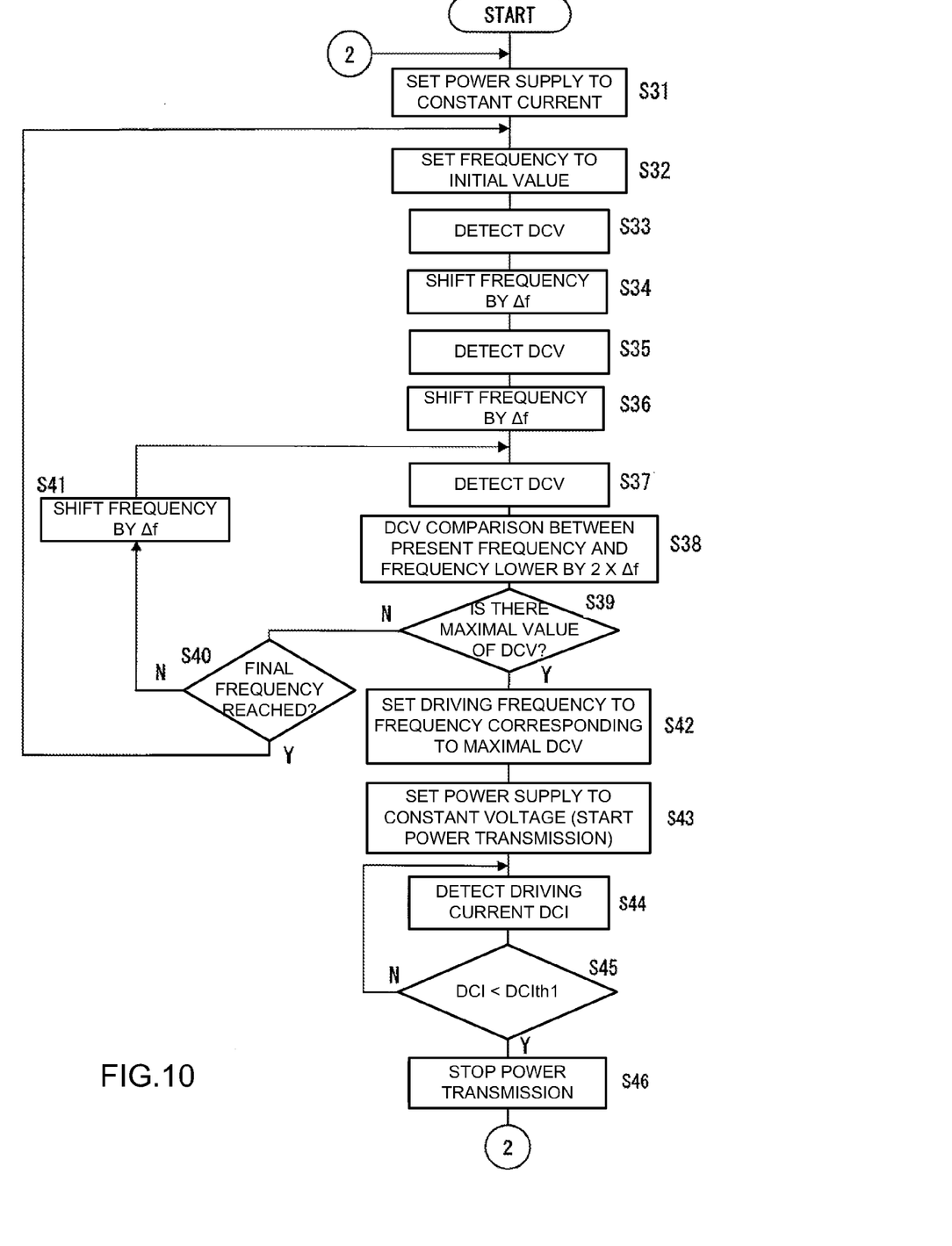
FIG. 10 is a flowchart illustrating the main processing steps performed by a control circuit of a transmitting apparatus according to a third exemplary embodiment.
Figure 11:
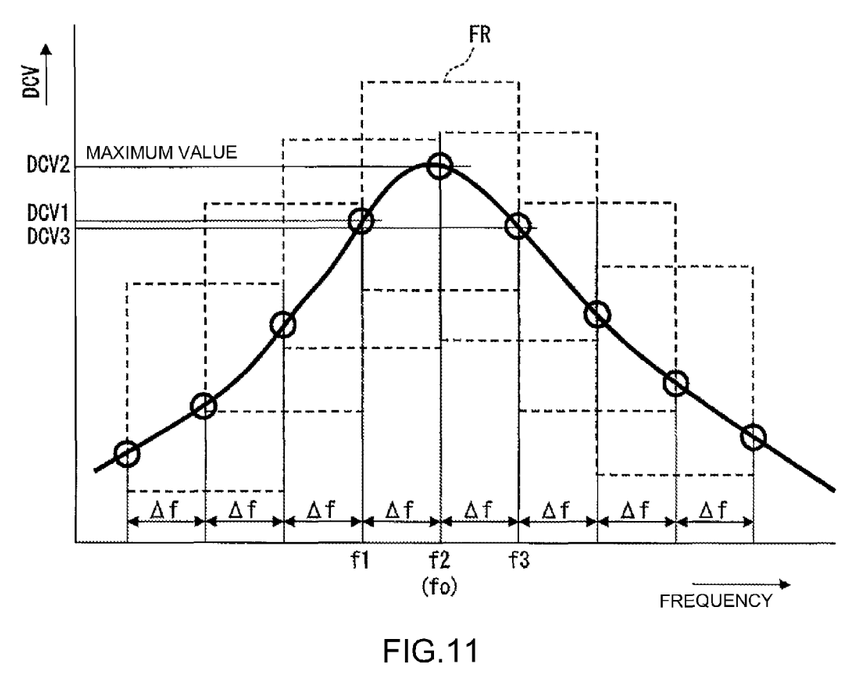
FIG. 11 illustrates detection of a frequency at which DCV becomes maximal through the processing steps illustrated in FIG. 10.

FIG. 10 is a flowchart illustrating the main processing performed by the control circuit of a transmitting apparatus according to the third embodiment. FIG. 11 illustrates exemplary frequency characteristics of DCV and exemplary values of DCV detected at respective frequencies. Hereinafter, description is made with reference to FIGS. 10, 11, and 4.

First, by switching of the power supply impedance switching circuit 57, a setting is made so as to supply a constant current to the switching circuit 56 (S31). Then, the initial value of a frequency range to be swept is set, and the driving control circuit 55 is driven at the frequency (S32). Then, in that state, a detection signal of the DCV/DCI detection circuit 53 is read (S33). Then the frequency is increased by an incremental amount, $\Delta f$ (S34). Then, in that state, a detection signal of the DCV/DCI detection circuit 53 is read (S35). Then, the frequency is increased by $\Delta f$ (S36). Then, in that state, a detection signal of the DCV/DCI detection circuit 53 is read (S37).

Then, DCV at the present frequency, DCV at a frequency lower than the present frequency by $\Delta f$, and DCV at a frequency lower than the present frequency by $2 \times \Delta f$ are compared and it is determined whether a maximal value exists (S38→S39). In other words, it is determined whether there is a maximal value of DCV within a frequency range FR between the present frequency and a frequency lower than the present frequency by $2 \times \Delta f$. Specifically, supposing that DCV at the lowest frequency f1 is DCV1, DCV at the middle frequency f2 is DCV2, and DCV at the highest frequency f3 is DCV3, in the frequency range, the middle frequency f2 is considered to be a frequency at which DCV becomes maximal, when the following conditions are satisfied:

DCV2−DCV1>Vth, and

DCV2−DCV3>Vth.

Here, Vth is a predetermined threshold. In this manner, when the change in the value of DCV with increasing frequency changes from positive to negative and the change in the value is larger than the predetermined threshold, the middle frequency f2 is considered to be a frequency at which DCV becomes maximal. Note that in a stage in which the values of DCV at the three frequencies f1, f2, and f3 have not yet been detected, as in the case in which the frequency is an initial value, processing may be performed assuming that the value of DCV at the lowest frequency f1 or the middle frequency f2 is the same as the present detected value.

Processing for detecting the maximal value of DCV is repeated by increasing the frequency by $\Delta f$ until the maximal value of DCV is detected (S40→S41→S37).

In FIG. 11, circles show the set frequencies and the values of DCV at the frequencies. The broken-line enclosures show frequency ranges for comparison in respective stages. When the frequency is changed from low to high, the frequency range (broken-line enclosure) for comparison moves sequentially toward the right.

In the stage in which the value of DCV at the frequency f3 is detected, the DCV value at the lowest frequency f1 is DCV1, the DCV value at the middle frequency f2 is DCV2, and the DCV value at the highest frequency f3 is DCV3. When these three values satisfy the conditions described above, the middle frequency f2 is considered to be a frequency fo at which DCV becomes maximal.

When the frequency reaches the maximum value thereof without detection of a maximal value of DCV, the flow returns to processing for frequency sweeping (S40→S32). (A maximal value of DCV does not exist when the power receiving apparatus is not mounted.)

When a maximal value of DCV is detected, the frequency fo is set as the driving frequency (S42). Then, by switching of the power supply impedance switching circuit 57, a setting is made so as to supply a constant voltage to the switching circuit 56. Thereby, power transmission is started (S43).

Then, a driving current DCI flowing through the switching circuit 56 is detected (S44). Then the flow waits until the driving current DCI becomes lower than a threshold DCIth1 (S45→S44 . . . ).

Once the driving current DCI has become lower than the threshold DCIth1, the driving of the driving control circuit 55 is stopped (S46).

After that, the flow returns to step S31. Thereby, the processing of step S31 and subsequent steps is repeated. However, since the secondary battery of the power receiving apparatus is already in a fully charged state, the condition for the determination in step S45 is satisfied, and hence, the battery is not charged again.

In the example described above, it is determined whether there is a maximal value on the basis of the values of DCV at three frequencies separated by unit frequencies Δf, and when there is a maximal value, the corresponding frequency is obtained. That is, it is determined whether there is a maximal value of DCV within a frequency range FR between the present frequency and a frequency lower than the present frequency by 2×Δf. However the present disclosure is not limited to this. For example, it may be determined whether there is a maximal value of DCV within a frequency range FR between the present frequency and a frequency lower than the present frequency by 4×Δf, by detecting five frequencies separated by frequencies Δf. Specifically, comparison may be made among DCV at the lowest frequency, DCV at the third frequency (middle frequency in the range), and DCV at the highest frequency in the frequency range FR. In other words, it may be determined whether a maximal value exists and the frequency of the maximal value may be obtained from these three values of DCV using the method described above. In this case, in the flowchart illustrated in FIG. 10, four steps, i.e., DCV detection, Δf frequency shifting, DCV detection, and Δf frequency shifting are added after step S36. In step S38, it is determined whether there is a maximal value and the frequency of the maximal value is obtained on the basis of the three DCV values at the first, third, and fifth frequencies in the frequency range FR, as described above.

Further, by widening the frequency range FR or increasing the number of samples, it may be determined whether there is a maximal value on the basis of a plurality of DCV values in the frequency range FR. For example, when the frequency range FR having a width of 6×Δf is used, it may be determined whether there is a maximal value by comparing DCV values at the lowest frequency, middle frequency, and highest frequency in the frequency range FR.

Embodiments using configurations disclosed herein can optimize the frequency of a voltage to be generated by a power transmitting apparatus, and power transmitting efficiency from the power transmitting apparatus to a power receiving apparatus can be easily maximized. Further, an overcurrent and an overvoltage at the time when a voltage with a constant current is supplied are prevented, resulting in reduced power consumption.

Embodiments that include a driving power supply circuit having a constant voltage source, a constant current diode that supplies a constant current from the constant voltage source to the high-frequency voltage generator circuit, and a bypass switch that bypasses the constant current diode, can allow a constant voltage source to be formed by turning on the switch. By turning off the switch, a constant current source can be easily formed using a constant current diode.

Embodiments that include driving power supply circuit having a constant voltage source, a resistor that supplies a current from the constant voltage source to the high-frequency voltage generator circuit, and a bypass switch that bypasses the resistor, can allow a constant voltage source to be formed by turning on the switch. By turning off the switch, a constant current source that supplies a nearly constant current through a resistor can be easily formed.

Embodiments according to the disclosure facilitate optimization of the frequency of a voltage to be generated by a power transmitting apparatus, and power transmitting efficiency from the power transmitting apparatus to a power receiving apparatus can be easily maximized. Further, an overcurrent and an overvoltage at the time when a voltage with a constant current is supplied are prevented, resulting in reduced power consumption.

While exemplary embodiments have been described above, it is to be understood that variations and modifications will be apparent to those skilled in the art without departing from the scope and spirit of the disclosure.

What is claimed is:

1. A power transmitting apparatus for forming a pair with a power receiving apparatus, the power receiving apparatus including secondary side coupling electrodes and a high-frequency voltage load circuit connected to the secondary side coupling electrodes and having a resonant circuit formed of the secondary side coupling electrodes and the high-frequency voltage load circuit, the power transmitting apparatus comprising:
   primary side coupling electrodes couplable to the secondary side coupling electrodes;
   a high-frequency voltage generator circuit adapted to apply a high-frequency voltage across the primary side coupling electrodes;
   a driving power supply circuit adapted to supply driving power to the high-frequency voltage generator circuit, said driving power supply circuit including a driving power supply switching unit adapted to supply either a constant current or a constant voltage to the high-frequency voltage generator circuit;
   a voltage detection unit adapted to detect a voltage supplied to the high-frequency voltage generator circuit; and
   a control unit adapted to detect a frequency at which the voltage supplied to the high-frequency voltage generator circuit becomes a maximal voltage for a change in frequency of a voltage generated by the high-frequency voltage generator circuit in a state in which the constant current is supplied, to set the frequency corresponding to the maximal voltage as the frequency of the voltage generated by the high-frequency voltage generator circuit, and to perform switching so as to supply the constant voltage.

2. The power transmitting apparatus according to claim 1, wherein the driving power supply circuit includes a constant voltage source, a constant current source, and a switch for switching between the constant voltage source and the constant current source.

3. The power transmitting apparatus according to claim 2, wherein the control unit includes a processing unit adapted to detect the frequency corresponding to the maximal voltage by executing the steps of:
   setting the driving power supply circuit to a constant current source;
   setting a frequency generated by the high-frequency voltage generator circuit to an initial value;
   detecting a voltage supplied to the high-frequency voltage generator circuit;
   increasing a frequency of a voltage generated by the high-frequency voltage generator circuit by an incremental amount;
   determining whether there is a maximal value of the voltage supplied to the high-frequency voltage generator circuit on the basis of voltages supplied to the high-frequency voltage generator circuit at the center and two ends of a frequency range composed of a plurality of continuous incremental amounts; and
   comparing the frequency of a voltage generated by the high-frequency voltage generator circuit with a final frequency value.

4. The power transmitting apparatus according to claim 2, wherein the control unit includes a processing unit adapted to detect the frequency corresponding to the maximal voltage by executing the steps of:

setting the driving power supply circuit to a constant current source;
setting a frequency of a voltage generated by the high-frequency voltage generator circuit to an initial value;
detecting a voltage supplied to the high-frequency voltage generator circuit;
increasing a frequency of a voltage generated by the high-frequency voltage generator circuit by an incremental amount;
comparing the frequency of a voltage generated by the high-frequency voltage generator circuit with a final frequency value; and
determining whether there is a maximal value of the voltage supplied to the high-frequency voltage generator circuit.

5. The power transmitting apparatus according to claim 1, wherein the driving power supply circuit includes a constant voltage source, a constant current diode that supplies a constant current from the constant voltage source to the high-frequency voltage generator circuit, and a bypass switch that bypasses the constant current diode.

6. The power transmitting apparatus according to claim 5, wherein the control unit includes a processing unit adapted to detect the frequency corresponding to the maximal voltage by executing the steps of:
setting the driving power supply circuit to a constant current source;
setting a frequency generated by the high-frequency voltage generator circuit to an initial value;
detecting a voltage supplied to the high-frequency voltage generator circuit;
increasing a frequency of a voltage generated by the high-frequency voltage generator circuit by an incremental amount;
determining whether there is a maximal value of the voltage supplied to the high-frequency voltage generator circuit on the basis of voltages supplied to the high-frequency voltage generator circuit at the center and two ends of a frequency range composed of a plurality of continuous incremental amounts; and
comparing the frequency of a voltage generated by the high-frequency voltage generator circuit with a final frequency value.

7. The power transmitting apparatus according to claim 5, wherein the control unit includes a processing unit adapted to detect the frequency corresponding to the maximal voltage by executing the steps of:
setting the driving power supply circuit to a constant current source;
setting a frequency of a voltage generated by the high-frequency voltage generator circuit to an initial value;
detecting a voltage supplied to the high-frequency voltage generator circuit;
increasing a frequency of a voltage generated by the high-frequency voltage generator circuit by an incremental amount;
comparing the frequency of a voltage generated by the high-frequency voltage generator circuit with a final frequency value; and
determining whether there is a maximal value of the voltage supplied to the high-frequency voltage generator circuit.

8. The power transmitting apparatus according to claim 1, wherein the driving power supply circuit includes a constant voltage source, a resistor that supplies a current from the constant voltage source to the high-frequency voltage generator circuit, and a bypass switch that bypasses the resistor.

9. The power transmitting apparatus according to claim 8, wherein the control unit includes a processing unit adapted to detect the frequency corresponding to the maximal voltage by executing the steps of:
setting the driving power supply circuit to a constant current source;
setting a frequency of a voltage generated by the high-frequency voltage generator circuit to an initial value;
detecting a voltage supplied to the high-frequency voltage generator circuit;
increasing a frequency of a voltage generated by the high-frequency voltage generator circuit by an incremental amount;
comparing the frequency of a voltage generated by the high-frequency voltage generator circuit with a final frequency value; and
determining whether there is a maximal value of the voltage supplied to the high-frequency voltage generator circuit.

10. The power transmitting apparatus according to claim 8, wherein the control unit includes a processing unit adapted to detect the frequency corresponding to the maximal voltage by executing the steps of:
setting the driving power supply circuit to a constant current source;
setting a frequency generated by the high-frequency voltage generator circuit to an initial value;
detecting a voltage supplied to the high-frequency voltage generator circuit;
increasing a frequency of a voltage generated by the high-frequency voltage generator circuit by an incremental amount;
determining whether there is a maximal value of the voltage supplied to the high-frequency voltage generator circuit on the basis of voltages supplied to the high-frequency voltage generator circuit at the center and two ends of a frequency range composed of a plurality of continuous incremental amounts; and
comparing the frequency of a voltage generated by the high-frequency voltage generator circuit with a final frequency value.

11. The power transmitting apparatus according to claim 1, wherein the control unit includes a processing unit adapted to detect the frequency corresponding to the maximal voltage by executing the steps of:
setting the driving power supply circuit to a constant current source;
setting a frequency of a voltage generated by the high-frequency voltage generator circuit to an initial value;
detecting a voltage supplied to the high-frequency voltage generator circuit;
increasing a frequency of a voltage generated by the high-frequency voltage generator circuit by an incremental amount;
comparing the frequency of a voltage generated by the high-frequency voltage generator circuit with a final frequency value; and
determining whether there is a maximal value of the voltage supplied to the high-frequency voltage generator circuit.

12. The power transmitting apparatus according to claim 1, wherein the control unit includes a processing unit adapted to detect the frequency corresponding to the maximal voltage by executing the steps of:
setting the driving power supply circuit to a constant current source;

setting a frequency generated by the high-frequency voltage generator circuit to an initial value;
detecting a voltage supplied to the high-frequency voltage generator circuit;
increasing a frequency of a voltage generated by the high-frequency voltage generator circuit by an incremental amount;
determining whether there is a maximal value of the voltage supplied to the high-frequency voltage generator circuit on the basis of voltages supplied to the high-frequency voltage generator circuit at the center and two ends of a frequency range composed of a plurality of continuous incremental amounts; and
comparing the frequency of a voltage generated by the high-frequency voltage generator circuit with a final frequency value.

13. A power transmission system comprising:
a power transmitting apparatus including:
  primary side coupling electrodes,
  a high-frequency voltage generator circuit adapted to apply a high-frequency voltage across the primary side coupling electrodes, and
  a driving power supply circuit adapted to supply driving power to the high-frequency voltage generator circuit; and
a power receiving apparatus including:
  secondary side coupling electrodes, and
  a high-frequency voltage load circuit connected to the secondary side coupling electrodes,
wherein, the power receiving apparatus has a resonant circuit formed of the secondary side coupling electrodes and the high-frequency voltage load circuit,
wherein the primary side coupling electrodes of the power transmitting apparatus and the secondary side coupling electrodes of the power receiving apparatus side coupling electrodes are adapted to capacitively couple to each other to transmit power, and
wherein the power transmitting apparatus further includes:
  a driving power supply switching unit adapted to allow the driving power supply circuit to supply either a constant current or a constant voltage to the high-frequency voltage generator circuit,
  a voltage detection unit adapted to detect a voltage supplied to the high-frequency voltage generator circuit, and
  a control unit adapted to detect a frequency at which the voltage supplied to the high-frequency voltage generator circuit becomes a maximal voltage for a change in frequency of a voltage generated by the high-frequency voltage generator circuit, in a state in which the constant current is supplied, to set the frequency corresponding to the maximal voltage as the frequency of the voltage generated by the high-frequency voltage generator circuit, and to perform switching so as to supply the constant voltage.

14. The power transmission system according to claim 13, wherein the driving power supply circuit includes a constant voltage source, a constant current source, and a switch for switching between the constant voltage source and the constant current source.

15. A power transmission system according to claim 13, wherein the control unit includes a processing unit adapted to detect the frequency corresponding to the maximal voltage by executing the steps of:
setting the driving power supply circuit to a constant current source;
setting a frequency generated by the high-frequency voltage generator circuit to an initial value;
detecting a voltage supplied to the high-frequency voltage generator circuit;
increasing a frequency of a voltage generated by the high-frequency voltage generator circuit by an incremental amount;
determining whether there is a maximal value of the voltage supplied to the high-frequency voltage generator circuit on the basis of voltages supplied to the high-frequency voltage generator circuit at the center and two ends of a frequency range composed of a plurality of continuous incremental amounts; and
comparing the frequency of a voltage generated by the high-frequency voltage generator circuit with a final frequency value.

* * * * *